US008271387B2

(12) United States Patent
Pieper et al.

(10) Patent No.: US 8,271,387 B2
(45) Date of Patent: Sep. 18, 2012

(54) METHOD AND APPARATUS FOR PROVIDING LIMITED ACCESS TO DATA OBJECTS OR FILES WITHIN AN ELECTRONIC SOFTWARE DELIVERY AND MANAGEMENT SYSTEM

(75) Inventors: Tobid Pieper, Concord, CA (US); Paul Martinelli, Berkeley, CA (US); Brad Thompson, Danville, CA (US); James Brentano, Orinda, CA (US); Brent Pietrzak, Lafayette, CA (US); Donald Turtle, Orinda, CA (US)

(73) Assignee: Intraware, Inc., Orinda, CA (US)

( * ) Notice: Subject to any disclaimer, the term of this patent is extended or adjusted under 35 U.S.C. 154(b) by 1987 days.

(21) Appl. No.: 11/158,972

(22) Filed: Jun. 20, 2005

(65) Prior Publication Data

US 2006/0287957 A1 Dec. 21, 2006

(51) Int. Cl.
*G06F 21/00* (2006.01)
*G06F 15/16* (2006.01)

(52) U.S. Cl. ............... 705/51; 705/52; 705/59; 709/203

(58) Field of Classification Search .................... 705/51; 709/203

See application file for complete search history.

(56) References Cited

U.S. PATENT DOCUMENTS 5,675,782 A * 10/1997 Montague et al. ................ 726/4
5,809,145 A * 9/1998 Slik et al. ......................... 705/52
6,006,035 A 12/1999 Nabahi
6,188,995 B1 * 2/2001 Garst et al. ...................... 705/59
6,202,070 B1 3/2001 Nguyen
6,266,694 B1 7/2001 Duguay
6,266,811 B1 7/2001 Nabahi
6,502,102 B1 12/2002 Haswell
6,519,571 B1 2/2003 Guheen
6,626,953 B2 9/2003 Johndrew
6,701,514 B1 3/2004 Haswell
6,718,535 B1 4/2004 Underwood
6,754,707 B2 6/2004 Richards
2001/0018673 A1 8/2001 Goldband et al.
2001/0027470 A1 10/2001 Ulmer et al.
2001/0049697 A1 12/2001 Johndrew et al.
2002/0047899 A1 * 4/2002 Son et al. ...................... 348/114

(Continued)

FOREIGN PATENT DOCUMENTS

EP 1 118 952 7/2001

(Continued)

OTHER PUBLICATIONS

ESD—Electornic Software Distributor; http: www.bcdsoftware.com/esd.htm, 2004.

(Continued)

*Primary Examiner* — Charles C Agwumezie
(74) *Attorney, Agent, or Firm* — Michael A. Glenn; Glenn Patent Group

(57) ABSTRACT

A method and apparatus for providing limited access to data objects or files within an electronic software delivery and management system are described. A data object is transmitted to the system for storage in a library. Input of one or more restriction parameters is further requested for the stored data object. A user interface is displayed in a display window for facilitating input of the restriction parameters. At least one customer is selected, such as, for example, one or more users authorized to receive the stored data object. The stored data object is further designated as restricted data object for the selected users. Finally, the user restriction information is stored in appropriate tables within a database.

12 Claims, 6 Drawing Sheets

U.S. PATENT DOCUMENTS

| | | | | |
|---|---|---|---|---|
| 2002/0161828 | A1* | 10/2002 | Edison et al. | 709/203 |
| 2002/0188706 | A1 | 12/2002 | Richards et al. | |
| 2003/0005427 | A1 | 1/2003 | Herrero | |
| 2003/0028825 | A1 | 2/2003 | Hines | |
| 2003/0221112 | A1 | 11/2003 | Ellis et al. | |
| 2004/0003266 | A1 | 1/2004 | Moshir et al. | |
| 2004/0015942 | A1* | 1/2004 | Branson et al. | 717/168 |
| 2004/0024775 | A1* | 2/2004 | Kemp | 707/102 |
| 2004/0068713 | A1 | 4/2004 | Yannakoyogas et al. | |
| 2004/0088680 | A1 | 5/2004 | Pieper et al. | |
| 2004/0141763 | A1 | 7/2004 | Tabb et al. | |
| 2004/0181771 | A1 | 9/2004 | Annonsen et al. | |
| 2006/0080257 | A1* | 4/2006 | Vaughan et al. | 705/51 |
| 2006/0122990 | A1* | 6/2006 | Smith et al. | 707/3 |
| 2006/0248116 | A1* | 11/2006 | Sobel | 707/104.1 |
| 2006/0282834 | A1* | 12/2006 | Cheng et al. | 717/174 |

FOREIGN PATENT DOCUMENTS

| | | |
|---|---|---|
| WO | WO 00/73958 | 12/2000 |
| WO | WO 01/01319 | 1/2001 |
| WO | WO 03/055129 | 7/2003 |
| WO | WO 2004/001589 | 12/2003 |

OTHER PUBLICATIONS

Electronic Software Distribution and Management for Enterprise-Class Applications; http://www.intraware.com/subsribenet/article1.html, 1996.

Netlib Services and Resources; Center for Research on Parallel Computation, Rice University, Houston, TX 1994.

Cluster-Based Scalable Network Services; University of California at Berkeley {fox, gribble, yatin, brewer}@cs.berkeley, edu, 1997.

ParaMEME: A Parallel Implementation and a Web Interface for a DNA and Protein Motif Discovery Tool; CABIOS, 12 (4):303-310, Nov. 15, 1996.

Putting it All in the Trunk: Incremetnal Software Development in the FreeBSD Open Source Project; Information Systems Journal vol. 11 No. 4 p. 321-36; Blackwell Scientific Publications; Oct. 2001; UK.

Legal Overkill Year 2000 Compliance; Information Week No. 46 p. 36-8; Emap Computing & CMP Media Inc.; Nov. 18, 1998; UK.

Beyond the Hype [Windows95]; LAN Magazine vol. 3, No. 10 p. 109-10, 113, 115-16; EMAP Business Publishing; Oct. 1995; UK.

Software Testing Cycles; Dr. Dobbs's Journal vol. 19, No. 2 p. 95; Feb. 1994; USA.

Finishing Touches (Databases); PC User No. 216 p. 39; Jul. 28-Aug. 1993 UK.

Lederhos, Mark; "Electronic Software Distribution . . . One Piece of a Much Bigger Picture"; May/Jun. 2004, Software Business Magazine, retrieved online from URL: http://www.softwawrebusinessonline.com, 2 pages.

Intraware; "Channel Manager"; Intraware SubscribeNet®; Jul. 2004; .001_channel manager data sheet, 3 pages.

* cited by examiner

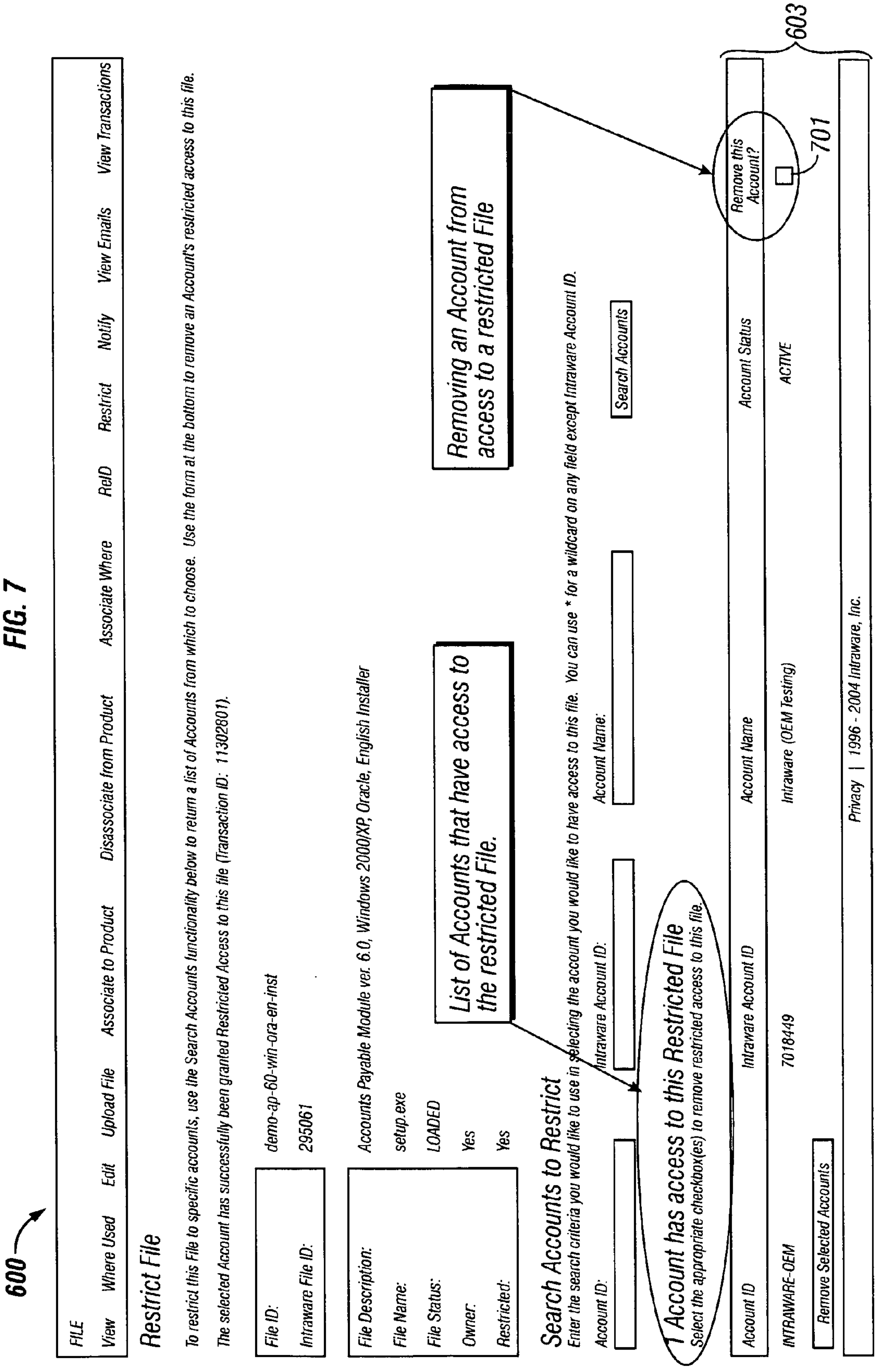

FILE
View  Where Used  Edit  Upload File  Associate to Product  Disassociate from Product  Associate Where  RelD  Restrict  Notify  View Emails  View Transactions

Restrict File

To restrict this File to specific accounts, use the Search Accounts functionality below to return a list of Accounts from which to choose. Use the form at the bottom to remove an Account's restricted access to this file.

The selected Account has successfully been granted Restricted Access to this file (Transaction ID: 11302801).

| | |
|---|---|
| File ID: | demo-ap-60-win-ora-en-inst |
| Intraware File ID: | 295061 |

| | |
|---|---|
| File Description: | Accounts Payable Module ver. 6.0, Windows 2000/XP, Oracle, English Installer |
| File Name: | setup.exe |
| File Status: | LOADED |
| Owner: | Yes |
| Restricted: | Yes |

*List of Accounts that have access to the restricted File.*

Search Accounts to Restrict
Enter the search criteria you would like to use in selecting the account you would like to have access to this file. You can use * for a wildcard on any field except Intraware Account ID.

Account ID: [    ]  Intraware Account ID: [    ]  Account Name: [    ]

[Search Accounts]

*1 Account has access to this Restricted File*
Select the appropriate checkbox(es) to remove restricted access to this file.

*Removing an Account from access to a restricted File*

| Account ID | Intraware Account ID | Account Name | | Account Status | Remove this Account? |
|---|---|---|---|---|---|
| INTRAWARE-OEM | 7018449 | Intraware (OEM Testing) | | ACTIVE | ☐ |

[Remove Selected Accounts]

Privacy | 1996 - 2004 Intraware, Inc.

METHOD AND APPARATUS FOR PROVIDING LIMITED ACCESS TO DATA OBJECTS OR FILES WITHIN AN ELECTRONIC SOFTWARE DELIVERY AND MANAGEMENT SYSTEM

TECHNICAL FIELD

The invention relates to storage and delivery of digital data objects or files such as, for example, software applications and/or data files and, more particularly, to a method and apparatus for providing limited access to data objects or files within an electronic software delivery and management system.

BACKGROUND OF THE INVENTION

Digital delivery has emerged as an efficient and profitable method of distributing digital goods such as, for example, software applications and/or data files. One type of digital good that is efficient for software manufacturers to distribute digitally comprises software product updates that consist of emergency bug fixes and patches. However, due to the emergency nature of these bug fixes and patches, software manufacturers typically perform only limited testing on them and therefore limit their distribution to only those customers who have reported the errors being remedied. The requirement to limit distribution of a software product update consisting of an emergency bug fix or patch to a particular customer or set of customers is one that current digital distribution systems are unable to address efficiently.

One prior attempt to provide efficient mechanisms for delivery of software bug fixes and patches to a particular customer enabled manufacturers to access the customer's servers directly and to update the software application. However, this solution requires the customer to expose its systems to external users, which could potentially lead to security breaches, and does not appear to provide any safeguard means for preventing the loss of updated data. Another prior attempt enabled the manufacturers to store the digital objects on a common FTP server and to grant access to customers to retrieve respective digital objects. However, this solution does not appear to limit file availability to target customers if an anonymous FTP is used. Alternatively, if a password-protected FTP is used, the system administrator of the FTP server must intervene to create and configure an FTP user account for each specific customer, and further must administer each of such accounts.

Therefore, there is a need to provide a method and apparatus for creating a delivery mechanism configured to enable manufacturers to deliver customer-specific data objects or files to particular existing customers. There is also a need to provide a method and apparatus for the customer-specific data objects or files that will not require involvement of information technology resources beyond those specifically designed to administer the software delivery process. There is a further need for a method and apparatus wherein customers should not be required to make any system configuration changes to access a customer-specific data object or file and should be able to download the customer-specific data object or file at any point in time. There is an additional need for manufacturers to be able to make data objects or files available to more than one specific, targeted customer.

SUMMARY OF THE INVENTION

A method and apparatus for providing access to specific data objects or files within a digital product to only a defined subset of the product manufacturer's customers who are entitled to receive that digital product, within an electronic software delivery and management system, is described. A data object or file is transmitted to the system for storage in a library. Input of one or more restriction parameters is further requested for the stored data object or file. A user interface is displayed in a display window for facilitating input of the restriction parameters. At least one customer is selected, such as, for example, one or more customers authorized to receive the stored data object or file. The stored data object or file is further designated as restricted data object or file for the selected customers. Finally, the customer restriction information is stored in appropriate tables within a database.

BRIEF DESCRIPTION OF THE DRAWINGS

FIGS. 5-7 illustrate exemplary user interfaces for facilitating input of customer restrictions associated with respective data objects or files according to one embodiment of the invention.

DETAILED DESCRIPTION

Figure 1:
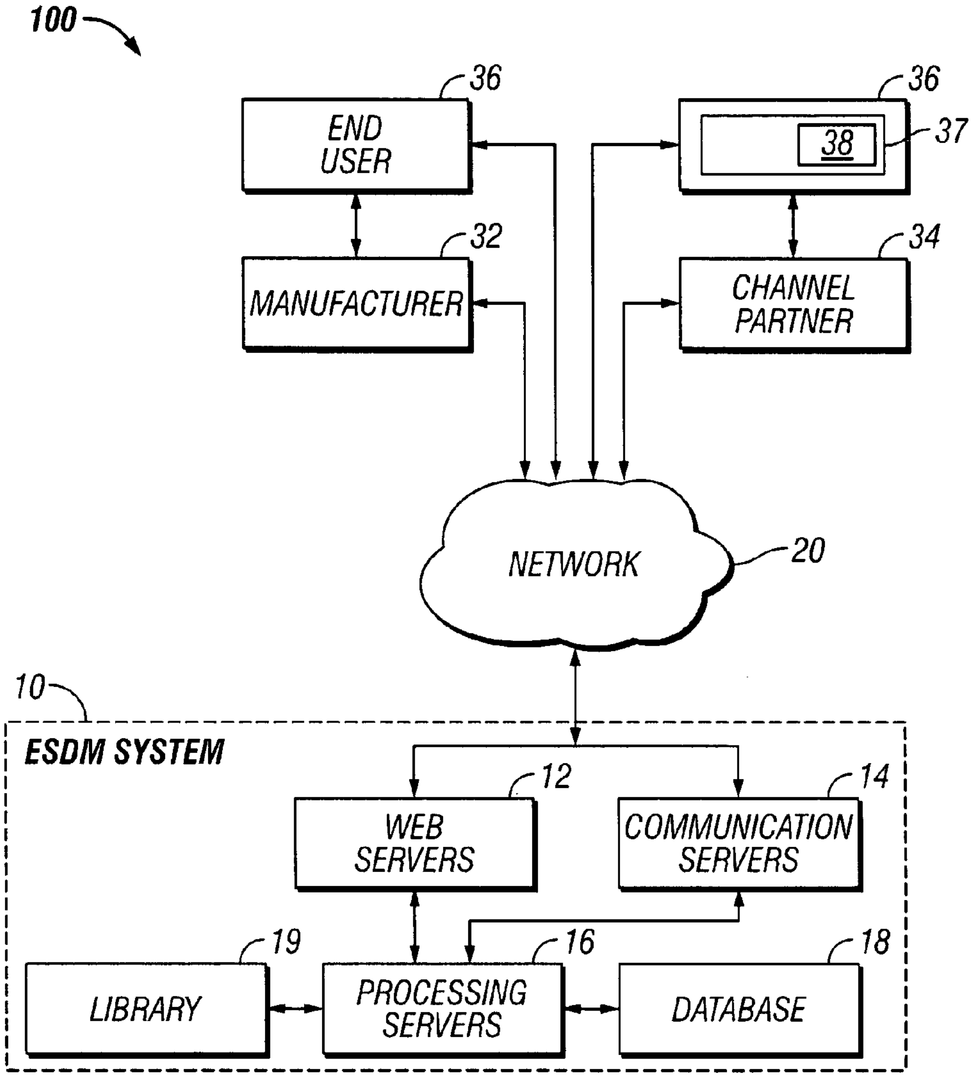
FIG. 1 is a block diagram illustrating an exemplary network environment including an apparatus for providing limited access to data objects or files within an electronic software delivery and management system according to one embodiment of the invention.

One aspect of the invention concerns an electronic software delivery and management (ESDM) system, which may be embodied by various hardware components and interconnections, with one example being described by the exemplary network environment 100 of FIG. 1. The system 100 includes various subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and signal bearing medium.

Basically, the environment 100, as illustrated in FIG. 1, includes multiple customers (exemplified by users 36) and an ESDM system 10. The customers 36 may also be referred to as a "client." The ESDM system 10 may be accessed by a client program 38, such as a browser, e.g. the Internet Explorer browser distributed by Microsoft Corporation of Redmond, Wash., that executes on a client machine 37 residing at the customer's 36 site and accesses the system 10 via a network 20, such as, for example, the Internet. Other examples of networks that a client may use to access the system 10 includes a wide area network (WAN), a local area network (LAN), a wireless network, e.g. a cellular network, the Plain Old Telephone Service (POTS) network, or other known networks. The customer 36 seek access to digital objects stored in a library 19, having earlier subscribed to,(or been entitled by the owner or developer of the digital objects) to ESDM services offered by an ESDM entity that operates the ESDM system 10.

The environment 100 further includes multiple digital object manufacturers, such as, for example, software applications manufacturers (exemplified by manufacturer 32) and multiple channel partners (exemplified by channel partner 34), which also access the system 10 via the network 20. In one embodiment, the channel partner 34 may be a large entity in a predetermined business relationship with the manufacturer 32, such as, for example, a distributor of software applications or an original equipment manufacturer (OEM), which is enabled to access the system 10 and to place and process orders for the associated end users 36. Alternatively, the channel partner 34 may be a small entity in a predetermined business relationship with the manufacturer 32, such as, for example, an application partner of the manufacturer 32. The manufacturers 32 and channel partners 34 access the system 10 via corresponding client machines residing at their respective sites, each client machine having a corresponding browser.

The system 10 further includes one or more of a number of types of front-end web servers 12, such as, for example, web page servers, which deliver web pages to multiple users, picture servers, which deliver images to be displayed within the web pages, and content servers, which dynamically deliver content information to the customers 36, the manufacturers 32 and the channel partners 34. In addition, the system 10 may include communication servers 14 that provide, inter alia, automated electronic mail (email) communications to/from customers 36, manufacturers 32, and channel partners 34, and automated real-time communications, such as, for example, instant messaging (IM) functionality.

The system 10 further includes one or more back-end servers, such as, for example, processing servers 16 or FTP servers, for enabling functionality of the system 10, specifically for facilitating delivery of digital objects, such as, for example, software applications, from software manufacturers 32 and channel partners 34 to their aggregated customer base (end users 36), as described in further detail below, and other known back-end servers configured to enable functionality of the system 10. The processing servers 16 are further coupled to a library 19, which stores the digital objects, and a database 18, which may, in one embodiment, be implemented as a relational database, and which contains data related to the customers 36, the manufacturers 32, and the channel partners 34, as described in further detail below. In an alternative embodiment, the database 18 may be implemented as a collection of objects in an object-oriented database.

In one embodiment, the web servers 12 may be implemented by a variety of known machines, such as computer workstations, personal computers, etc. The web servers 12 also perform specific tasks such as presenting a web page providing instructions for customers seeking access to digital objects in the library, authenticating users according to the web server access codes, generating temporary FTP access codes for authenticated customers' use at the servers 16, and redirecting authenticated customers to the servers 16.

The servers 16 comprise some or all of one or more digital data storage machines, such as a UNIX, Linux, Microsoft NT, Microsoft Windows. The processing servers 16 perform specific tasks such as authenticating customers according to temporary access codes and, upon successful authentication, making digital objects from the library 19 available to the customers pursuant to a predetermined mapping.

In one embodiment, the ESDM system 10 serves to manage discovery and delivery of digital objects from the library 19 to customers 36 that are authorized to receive such objects by subscription, contract, payment, or other arrangement, such as, for example, customers 36 entitled to product documentation or applications comprised of several data objects. As a particular example, the ESDM system 10 may be implemented using the hardware structure (with various changes according to the present disclosure) used to implement the SubscribeNet® service of Intraware, Inc., of Orinda, Calif., which has been in commercial use for some time.

The library 19 contains many different stored digital objects such as software, data constructs, data files, or other machine readable digital objects. The library 19 comprises some or all of one or more data storage devices, machines, physical or logical storage constructs, etc, such as, for example, software programs, updates, revisions, and the like. For instance, a third party software producer may contract with the entity operating the ESDM system 10 to provide authorized customers with access to that third party's software applications.

Figure 2:
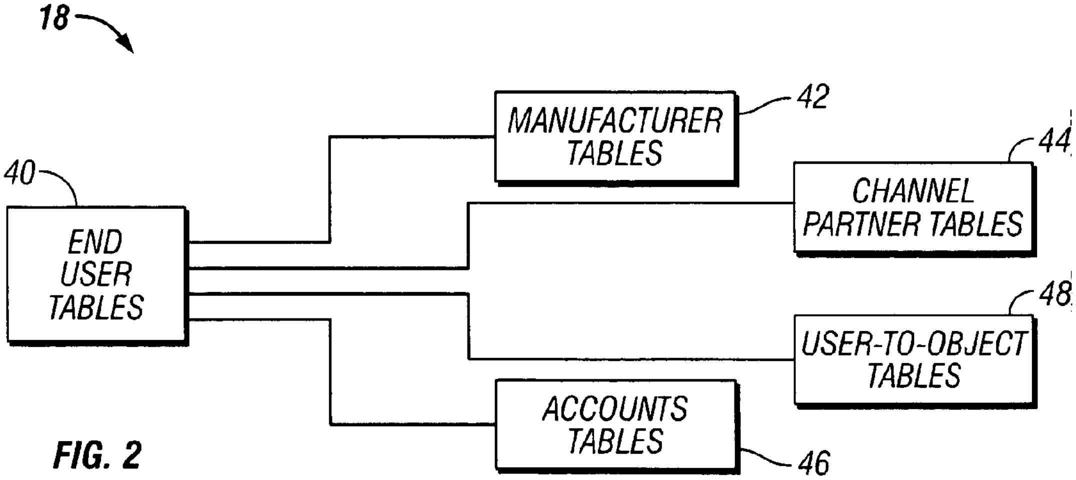
FIG. 2 is a block diagram illustrating a database, which at least partially implements and supports the apparatus for providing limited access to data objects or files according to one embodiment of the invention.

FIG. 2 is a block diagram illustrating a database 18, which at least partially implements and supports the ESDM system 10, according to one embodiment of the invention. The database 18 may, in one embodiment, be implemented as a relational database, and includes a number of tables having entries, or records, that are linked by indices and keys. In an alternative embodiment, the database 18 may be implemented as a collection of objects in an object-oriented database, or as a file system, linked list, directory server, e.g. LDAP, Windows domain controller, or other suitable construct.

As illustrated in FIG. 2, in one embodiment, the database 18 contains various metadata relating to operation of the web servers 12 and processing servers 16. Central to the database 18 are one or more customer tables 40, which contain records for each entity or customer of the system 10. The database 18 also includes accounts tables 46, which may be linked to the customer tables 40 and may be populated with account, product, and/or order information related to each user of the system 10, such as the manufacturers 32, the channel partners 34, and the customers 36.

In one embodiment, the customer tables 40 may include web server access codes, comprising a list of recognized customers (for example by user ID) and password or other login information required to use the web site supported by the web servers 12. The customer tables 40 may also contain a mapping of which customers are authorized to access which of the stored digital objects or files contained in the library 19, according to their original purchase products associated with such digital objects or files. Depending upon customer activity at any time, the database 18 may also contain various temporary FTP access codes, generated by the web servers 12 for customers to use in logging in to the system 10.

The database 18 may include a number of other tables, which may also be linked to the user table 40, for example, tables specifically provided to enable an exemplary embodiment of the invention. One or more manufacturer tables 42 are configured to store data related to the manufacturers 32 allowed to access the system 10 via the network 20, such as, for example, manufacturer codes, IDs, passwords, and other information. Furthermore, one or more channel partner tables 44 are configured to store data related to the channel partners 34 allowed to access the system 10 via the network 20, such as, for example, unique channel partner codes directly associated with one or more manufacturer codes representing specific manufacturers 32.

The database 18 further includes user-to-object tables 48 configured to define which customers 36 can access specific data objects within the library 19. If a customer restriction is placed on a data object, such as, for example a data file included within a collection of files forming the product documentation, then the data object is only exposed to the respective customer 36. Consequently, if no customer restrictions exist, then the data object is available to any customer 36 entitled to receive the respective product documentation or application.

In one embodiment, each software manufacturer 32 controls the actions that an associated channel partner 34 may perform while accessing the system 10 by defining in the partner tables 44 which of the existing permissions apply to the respective channel partner 34. For example, the manufacturer 32 may define accounts permissions, which enable the channel partner 34 to add and modify accounts, order permissions, which enable the channel partner 34 to process and modify orders submitted by the end users 36 and/or by the channel partner 34, and product management permissions, which enable the channel partner 34 to add and modify product information stored in the library 19.

In one embodiment, each manufacturer 32 controls each channel partners' 34 access to account, order, or product information that has originated from the respective manufacturer 32 by electing to share such information with specified channel partners 34. Thus, each account, product, or order in the accounts tables 46 is configured to support multiple codes, manufacturer codes, channel partner codes, etc., with a specific manufacturer code assigned as the owner. In an alternate embodiment, each channel partner 34 controls each manufacturer's 32 access to account, order, or product information that has originated from the respective channel partner 34 by electing to share such information with specified manufacturers 32. Thus, each account, product, or order in the accounts tables 46 is configured to support multiple codes, manufacturer codes, channel partner codes, etc., with a specific channel partner code assigned as the "owner."

Figure 3:
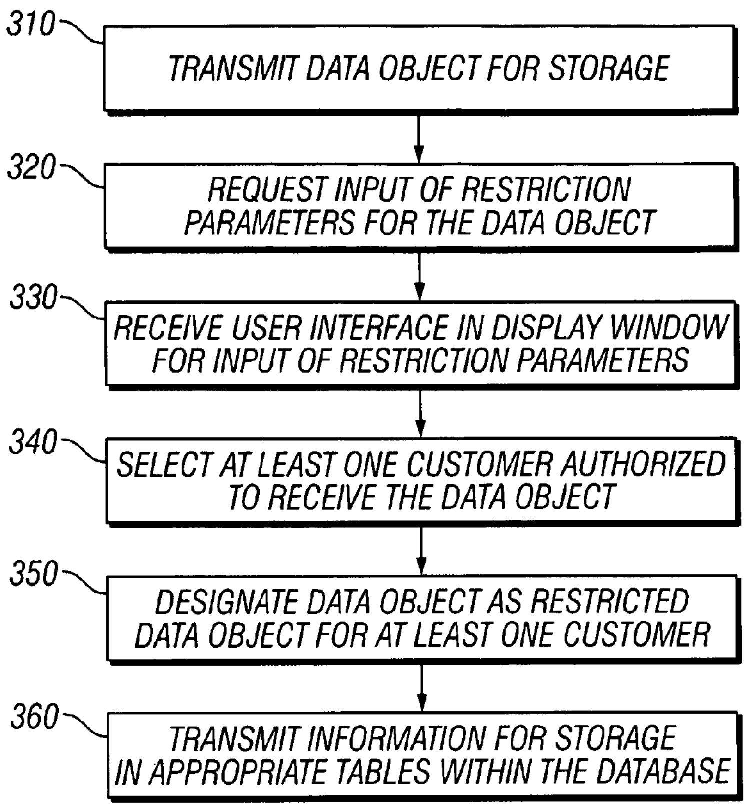
FIG. 3 is a flow diagram illustrating a method for facilitating input of customer restrictions associated with respective data objects or files, according to one embodiment of the invention.
Figure 5:
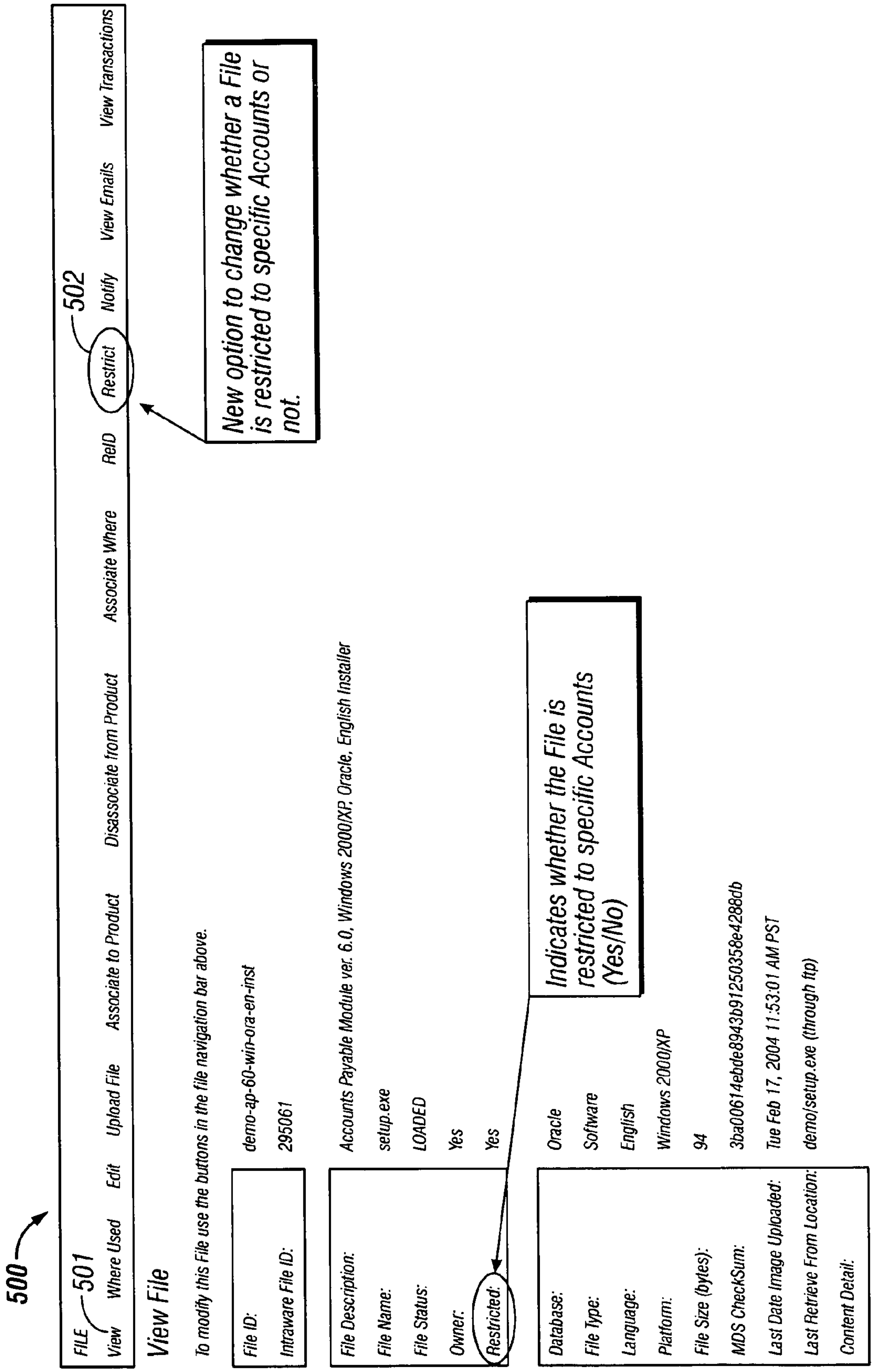
Figure 6:
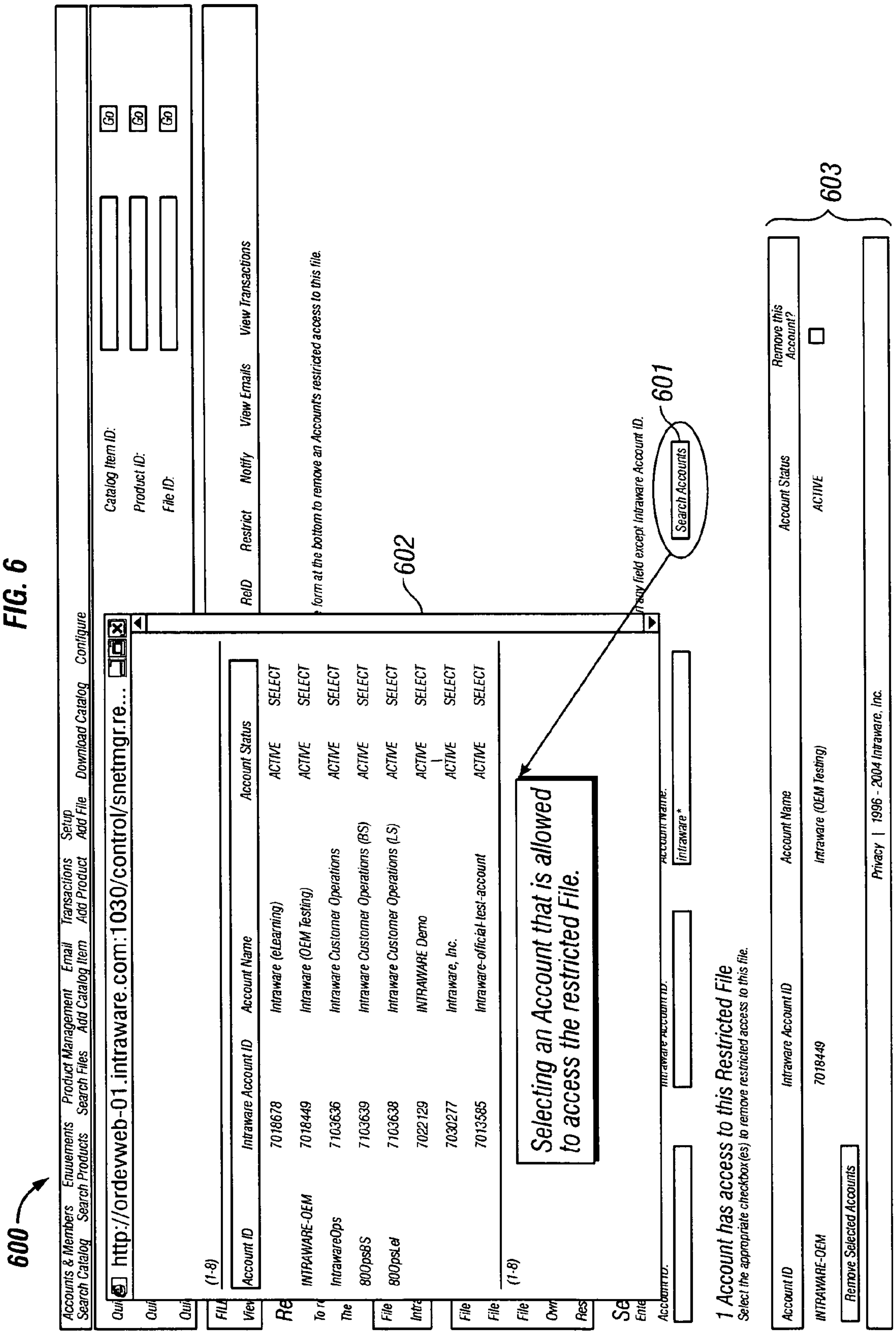

FIG. 3 is a flow diagram illustrating one embodiment for a method for facilitating input of customer restrictions associated with respective data objects or files. FIGS. 5, 6, and 7 illustrate exemplary user interfaces for facilitating input of customer restrictions associated with respective data objects or files.

In an ESDM system, customers are authorized to access data objects or files based on entitlement data. These objects are typically grouped in packages which are made available as a whole to those who are entitled. The preferred embodiment of the invention concerns:

- How to make exceptions within the package so that only specifically identified accounts can access certain data objects or files within the package; and
- How to make these data objects or files available without the need to create an additional entitlements.

Referring to FIG. 3, at processing block 310, a data object is transmitted to the system 10 for storage in the library 19. In one embodiment, a manufacturer 32 accesses the EDSM system 10 via the network 20, the web servers 12 and/or the communication servers 14 and stores a data object in the library 19, such as, for example, an update, a bug fix, an emergency software patch, a release notification, or any other data object pertaining to a collection of data objects already stored in the library 19.

At processing block 320, input of one or more restriction parameters is requested for the stored data object. In one embodiment, the manufacturer 32 accesses the EDSM system 10 via the network 20, the web servers 12 and/or the communication servers 14 and requests to input a restriction on the availability of the stored data object to certain customers 36 of the system 10.

At processing block 330, a user interface is received in a display window for facilitating input of the restriction parameters. In one embodiment, in response to the request, the processing servers 16 within the system 10 transmit an interactive user interface 500 to the manufacturer 32 via the front end servers 12, 14 and the network 20, the user interface 500 being illustrated and described in further detail in connection with FIG. 5.

As illustrated in FIG. 5, the user interface 500 is displayed for the manufacturer 32 in a display window and further includes multiple links, interactive buttons, and/or icons, which enable the manufacturer 32 to view data object information stored in the database 18 and associated with the stored data object and further facilitate input of customer restrictions. In one embodiment, the manufacturer 32 activates a View button or link 501 with a conventional mouse click command and requests the display of data object information from the system 10 via the network 20. The processing servers 16 within the system 10 receive the request, retrieve the data object information from the database 18 and display the information in the user interface 500 via the web servers 12 and the network 20. In one embodiment, the data object information may include, but is not limited to, file identification information, file description information, a file name, file status information, ownership information, any restriction information, and other specific technical information, such as a file type, language, software platform, file size, file access and viewing history. Next, the manufacturer 32 activates a Restrict button or link 502 with a conventional mouse click command, the Restrict button or link 502 being configured to restrict the stored data object to specific users 36 or to remove prior restrictions placed on the stored data object, as described in further detail in connection with FIG. 3.

Referring back to FIG. 3, at processing block 340, at least one customer, such as, for example, one or more users 36, authorized to receive the stored data object is selected. In one embodiment, in response to activation of the Restrict button or link 502, the processing servers 16 within the system 10 transmit an interactive user interface 600 to the manufacturer 32 via the front end servers 12,14 and the network 20, the user interface 600 being illustrated and described in further detail in connection with FIG. 6.

As illustrated in FIG. 6, the user interface 600 is displayed for the manufacturer 32 in a display window and further includes multiple links, interactive buttons, and/or icons, which enable the manufacturer 32 to select one or more users 36 authorized to retrieve the stored data object from the library 19. In one embodiment, the manufacturer 32 activates a Search Accounts button 601 with a conventional mouse click command and transmits a request to the system 10 to view all eligible users 36 that are entitled to the collection of data objects stored in the library 19, including the stored data object to be restricted. Responsive to the activation of the button 601, the processing servers 16 retrieve the customers 36 from the database 18 and display the customers 36 for the manufacturer 32 in a pop-up display window 602. The manufacturer 32 selects one or more customers 36 authorized to retrieve and view the stored data object. The selected customers 36 are subsequently displayed in an account area 603 within the user interface 600.

Referring back to FIG. 3, at processing block 350, the stored data object is designated as restricted data object for the selected one or more customers, such as, for example, customers 36. In one embodiment, upon selection of the customers 36, the stored data object is designated as a restricted data object and the customers are displayed in the account area 603 within the user interface 600.

Finally, at processing block 360, the customer restriction information is transmitted to the system 10 for storage in the appropriate tables 48 within the database 18. In one embodiment, the processing servers 16 receive the customer restriction information via the network 20 and store the information in the database 18.

In one embodiment, the customers 36 may be subsequently removed from the account area 603 and the restriction status of the stored data object may be changed, as illustrated and described in further detail in connection with FIG. 7.

As illustrated in FIG. 7, in one embodiment, the account area 603 of the user interface 600 further includes a Remove This Account box 701, associated with each displayed customer 36, and a Remove Selected Accounts button 702 for facilitating removal of the customer restrictions. The manufacturer 32 checks the box 701 pertaining to the customer 36 to be removed from the restriction list with a conventional mouse click command and activates the button 702 to request removal of the restricted access to the stored data object. The processing servers 16 receive the request via the network 20 and remove the customer restrictions from the tables 48 within the database 18.

Figure 4:
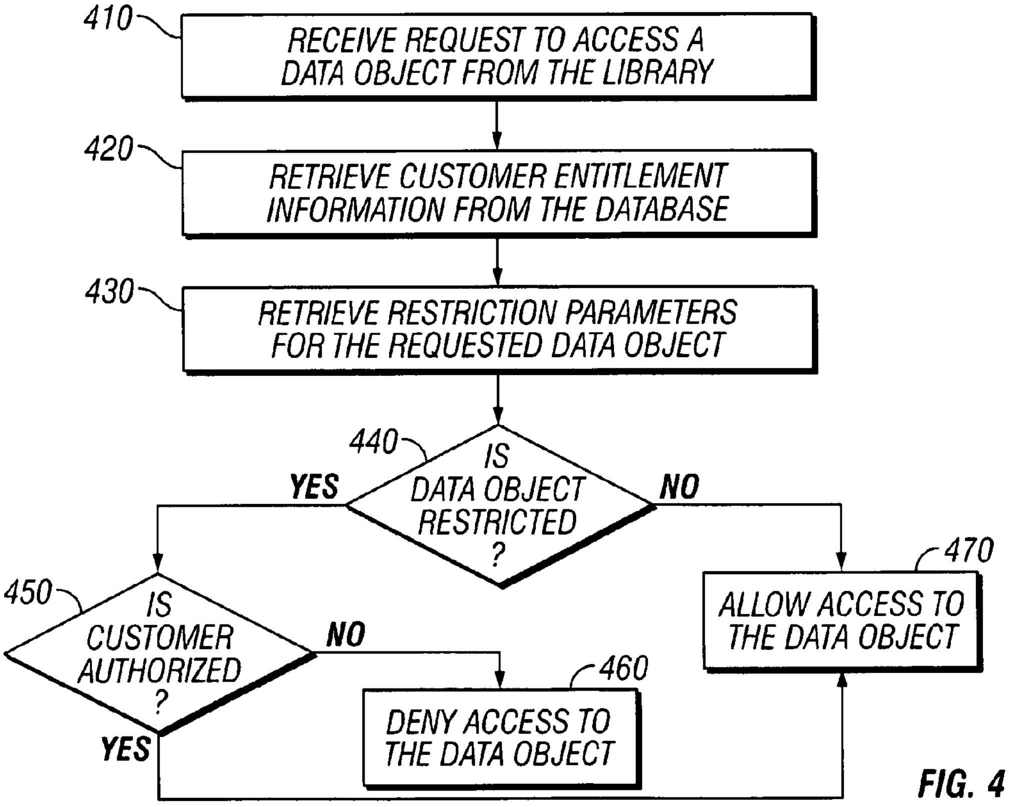
FIG. 4 is a flow diagram illustrating a method for facilitating delivery of data objects or files from software manufacturers and channel partners to restricted customer according to one embodiment of the invention.

FIG. 4 is a flow diagram illustrating a method for facilitating delivery of data objects from software manufacturers and channel partners to restricted customers. As illustrated in FIG. 4, in one embodiment, at processing block 410, a request to access a data object stored in the library 19 is received. In one embodiment, the processing servers 16 receive the request from a customer 36 via the network 20, the web servers 12, and/or the communication servers 14.

At processing block 420, customer entitlement information is retrieved from the database 18. In one embodiment, responsive to the request, the processing servers 16 retrieve entitlement information associated with the customer 36 from the tables 40 within the database 18.

At processing block 430, restriction parameters for the requested data object are retrieved. In one embodiment, responsive to the request, the processing servers 16 retrieve any user restrictions associated with the stored data object from the tables 48 within the database 18.

At processing block 440, a decision is made whether the stored data object is restricted to specific customers. In one embodiment, the processing servers 16 determine if the stored data object has any associated customer restrictions.

If the stored data object is restricted to specific customers, then at processing block 450, a decision is made whether the customer 36 that requested the stored data object is authorized to access the data object. In one embodiment, the processing servers 16 determine if the customer 36 is authorized to access the data object. If the customer 36 is not authorized, then at processing block 460, access to the data object is denied. In one embodiment, the processing servers 16 transmit a denial of access to the customer 36 via the network 20, the web servers 12, and/or the communication servers 14.

Otherwise, if the stored data object has no associated user restrictions, or if the customer 36 is authorized to access the data object, at processing block 470, access to the data object is allowed. In one embodiment, the processing servers 16 transmit an approval of access to the customer 36 via the network 20, the web servers 12, and/or the communication servers 14.

Figure 8:
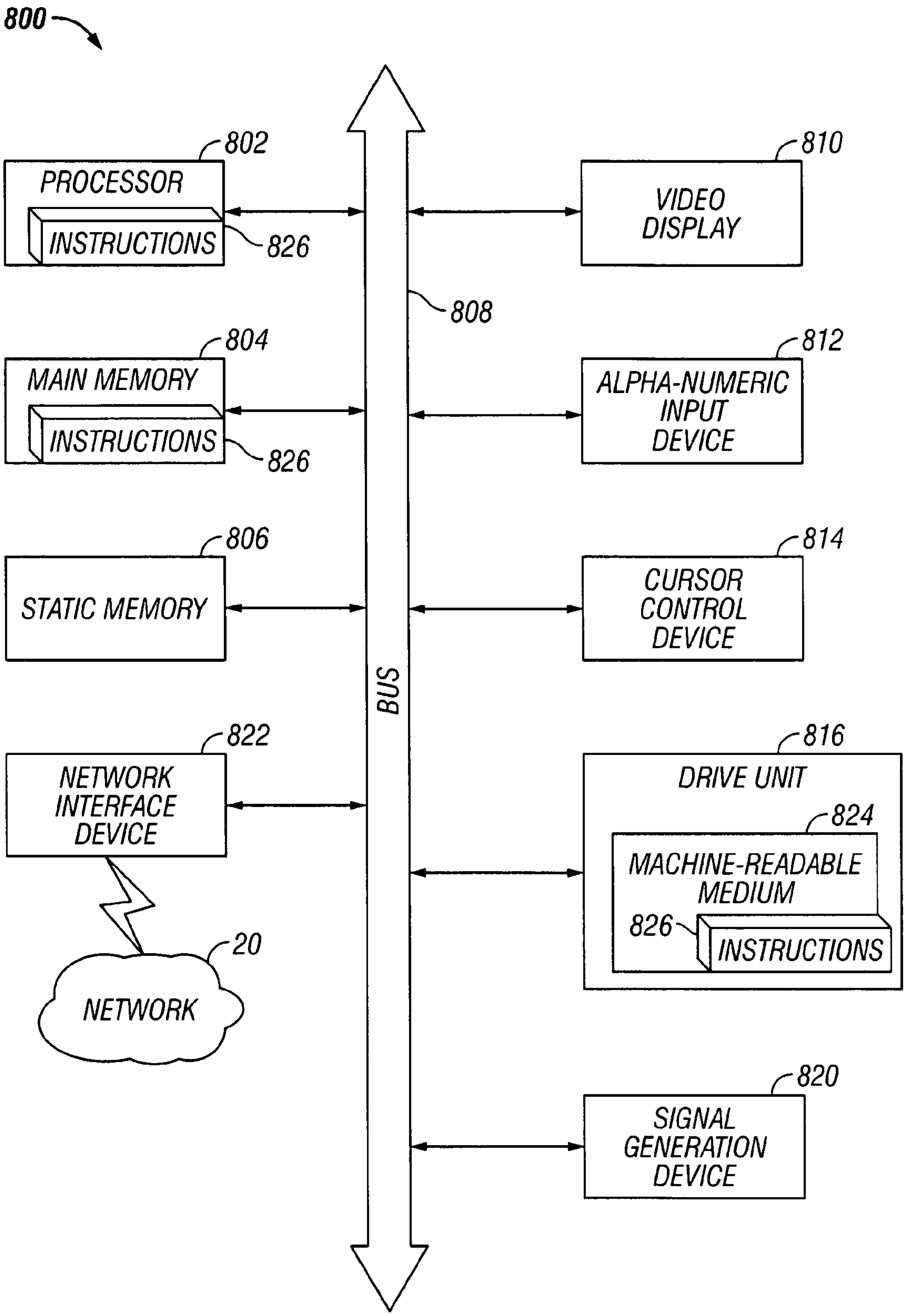
FIG. 8 is a diagrammatic representation of a machine in the exemplary form of a computer system within which a set of instructions may be executed.

FIG. 8 shows a diagrammatic representation of a machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810, e.g. a liquid crystal display (LCD) or a cathode ray tube (CRT). The computer system 800 also includes an alphanumeric input device 812, e.g, a keyboard, a cursor control device 814, e.g. a mouse, a disk drive unit 816, a signal generation device 818, e.g. a speaker, and a network interface device 820.

The disk drive unit 816 includes a machine-readable medium 824 on which is stored a set of instructions, i.e. software, 826 embodying any one, or all, of the methodologies described above. The software 826 is also shown to reside, completely or at least partially, within the main memory 804 and/or within the processor 802. The software 826 may further be transmitted or received via the network interface device 820.

In contrast to the system 800 discussed above, a different embodiment of the invention uses logic circuitry instead of computer-executed instructions to implement processing entities such as the web servers 12, processing servers 16, etc. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. An electronic software delivery and management (ESDM) apparatus, comprising:

a library storing multiple digital objects each submitted by one of multiple third party manufacturers or channel partners for customers to retrieve via the ESDM apparatus;

a database; and at least one digital data processing machine coupled to the library and database, wherein the digital data processing machine further comprises at least one processing module receiving at least one third party access restriction request to input customer restrictions on access to a digital object stored in the library, said customer restrictions comprising one or more access restriction parameters, said digital object having been submitted by the third party;

an interface coupled to said at least one digital data processing machine facilitating input of said one or more access restriction parameters, said interface comprising a restrict button or link to restrict the stored digital object to specific customers or to remove prior access restrictions placed on the stored digital object;

wherein said at least one processing module:

facilitating selection by said third party of at least one customer authorized to receive said stored digital object from the library as defined by said customer restrictions and in response to said at least one access restriction request; and designating the stored digital object as a restricted digital object for the selected at least one customer; and wherein said at least one processing module storing said customer restrictions in the database and thereafter operating the ESDM to regulate access to said digital object only to said at least one authorized customer prior to said at least one authorized user obtaining said digital object from said at least one digital data processing machine.

2. A computer implemented method for facilitating input of customer restrictions associated with respective digital objects or files, comprising the steps of:

transmitting a digital object to an ESDM system for storage in a library;

requesting input of one or more access restriction parameters for said stored digital object;

receiving an interface in a display window for facilitating input of said access restriction parameters;

activating a restrict button or link to restrict the stored digital object to specific customers or to remove prior access restrictions placed on the stored digital object;

selecting at least one customer authorized to receive the stored digital object from the library on the basis of said access restriction parameters;

designating the stored digital object as a restricted digital object for the selected one or more customers; and transmitting the customer access restriction information to said ESDM system for storage in appropriate tables within a database.

3. The method of claim 2, wherein customers are authorized to access digital objects or files based on entitlement data.

4. The method of claim 2, wherein said objects are grouped in packages which the ESDM system makes available as a whole to customers who are entitled, and wherein the ESDM system only permits specifically identified accounts to access certain digital objects or files within the package, and wherein the ESDM system makes said digital objects or files available to said customers independent of creation of any additional entitlements.

5. The method of claim 2, further comprising the steps of:

responsive to receiving selection of a customer to be removed from the access restriction list, said ESDM system removing the customer restrictions from the tables within the database.

6. An electronic software delivery and management apparatus, comprising:

a library storing digital objects;

a database storing access entitlement information and access restriction parameters; and at least one digital data processing machine coupled to the library and the database, the digital data processing machine programmed to perform operations to facilitate delivery of said digital objects or files from software manufacturers and channel partners to customers;

wherein said processing machine comprises at least one processing module receiving a request to access one of said digital objects stored in said library;

wherein said at least one processing module retrieving customer entitlement information from tables within the database, wherein said access entitlement information is associated with a customer;

wherein said at least one processing module retrieving access restriction parameters for the requested digital object;

wherein said at least one processing module determining whether access to the stored digital object is restricted to specific customers based on said customer entitlement information and said access restriction parameters;

wherein said at least one processing module denying the customer access to the digital object if access to the stored digital object is restricted to specific customers and the customer that requested access to the stored digital object is not one of said specific customers;

wherein said at least one processing module allowing the customer access to the digital object if access to the stored digital object has no associated customer restrictions or if the customer is one of said specific customers; and wherein said at least one processing module transmitting an approval of access to the customer.

7. A computer implemented network connected electronic software delivery and management (ESDM) apparatus, operated by one party on behalf of multiple different third party entities for customers of the entities to retrieve digital objects corresponding to the entities via the ESDM apparatus, the apparatus comprising:

a library programmed to receive and store multiple digital objects, each digital object exclusively corresponding to one of the entities, the digital objects comprising software modules, updates, bug repairs, patches, and release notifications;

a web server comprising at least one processing module, upon receiving a request from one of the entities to input access restriction parameters, providing a web accessible interface structured to receive input of said access restriction parameters by the requesting entity;

wherein the at least one processing module presenting, via the interface, metadata pertaining only to the digital objects corresponding to the requesting entity, and permitting the requesting entity to designate any of said digital objects as having restricted access thereto;

wherein the at least one processing module presenting, via the interface, a searchable list of customers of the requesting entity, and permitting the requesting entity to designate from the presented list one or more customers to have access to said restricted digital object; and wherein the at least one processing module authenticating customers requesting access to digital objects in the library;

a database programmed to store access entitlement information including digital objects that are restricted and customers that are designated to have access to said restricted digital objects; and a processing server providing customer access to said digital objects in the library, wherein the processing server, upon receiving a request from an authenticated customer to access a digital object from the library, retrieving customer entitlement information for the requested digital object from the database; and wherein the processing server providing access to each requested digital object only to the customers designated by the entity corresponding to the digital object to have access to the requested digital object as indicated in the entitlement information.

8. The apparatus of claim 7, where the entities include at least one of:

manufacturers of digital objects stored in the library;

channel partners including (1) distributors of digital objects stored in the library and (2) original equipment manufacturers (OEM) providing products that contain digital objects in the library.

9. The apparatus of claim 8, where the ESDM apparatus is programmed such that manufacturers establish account permissions determining whether channel partners are permitted to add or modify customer accounts, order permissions, process and modify orders submitted by customers, and add or modify product information stored in library.

10. The apparatus of claim 8, where the ESDM apparatus is programmed such that channel partners control manufacturer access to customer account information, order data, and product information originating from the channel partner.

11. The apparatus of claim 7, where the digital objects are implemented as files and the metadata includes all of the following: file identification information, file description information, file name, file status information, ownership information, entitlement information, file type, language, software platform, file size, and file access and viewing history.

12. The apparatus of claim 7, where the processing server is programmed to perform further operations responsive to a request from an authenticated customer to access a digital object from the library, comprising: transmitting a message approving or denying access to the digital object according to results of the retrieval of the customer entitlement.

* * * * *